US011416926B1

(12) United States Patent
Showalter et al.

(10) Patent No.: US 11,416,926 B1
(45) Date of Patent: Aug. 16, 2022

(54) INTELLIGENT DATA MATCHING AND VALIDATION SYSTEM

(71) Applicant: Candor Technology Inc., The Villages, FL (US)

(72) Inventors: Thomas William Showalter, The Villages, FL (US); Chad Wille, Canton, GA (US)

(73) Assignee: Candor Technology Inc., The Villages, FL (US)

( * ) Notice: Subject to any disclaimer, the term of this patent is extended or adjusted under 35 U.S.C. 154(b) by 239 days.

(21) Appl. No.: 16/803,640

(22) Filed: Feb. 27, 2020

Related U.S. Application Data

(60) Provisional application No. 62/811,179, filed on Feb. 27, 2019.

(51) Int. Cl.
*G06Q 10/10* (2012.01)
*G06Q 40/02* (2012.01)
(Continued)

(52) U.S. Cl.
CPC .......... *G06Q 40/025* (2013.01); *G06F 16/27* (2019.01); *G06N 3/0472* (2013.01); *G06N 3/08* (2013.01);
(Continued)

(58) Field of Classification Search
CPC .. G06Q 40/025; G06Q 10/10; G06Q 2220/00; G06F 16/27; G06N 3/0472; G06N 3/08; H04L 9/3234; H04L 2209/38
(Continued)

(56) References Cited

U.S. PATENT DOCUMENTS 7,640,209 B1 * 12/2009 Brooks ................ G06Q 40/025
705/38
7,788,186 B1 * 8/2010 An ...................... G06Q 30/0278
705/306
(Continued)

FOREIGN PATENT DOCUMENTS

WO WO-2021158702 A1 * 8/2021 ............. G06N 20/00

OTHER PUBLICATIONS

Sanford et al., "Operational risk modelling and organizational learning in structured finance operations: a Bayesian network approach", The Journal of the Operational Research Society 66/1:86-115, Taylor & Francis Ltd., Jan. 2015.*

*Primary Examiner* — Frantzy Poinvil
(74) *Attorney, Agent, or Firm* — Morris, Manning & Martin, LLP; Daniel E. Sineway, Esq.

(57) ABSTRACT

An intelligent data matching and validation system, and associated methods, are disclosed. The system includes various processors, databases, and immutable ledgers for analyzing data such as, but not limited to, loan data. The system leverages intelligent resources such as Bayesian inference networks for determining high correlation events representative of likely outcomes based on data parameters. The system automatically updates the Bayesian inference network's weighted coefficients in response to processing loan data and corresponding target events, such as repurchase requests. The system stores outcomes from the Bayesian inference networks, as well as loan histories and associated loan data, in a ledger that is accessible to third parties via a unique cryptographic token. In one embodiment, the system conducts an intelligent underwriting of a loan or other financial asset, leveraging its access to and ability to interpret and compare data from multiple sources that lead to the intelligent underwriting of a loan.

18 Claims, 7 Drawing Sheets

(51) Int. Cl.
   *G06N 3/04*     (2006.01)
   *G06F 16/27*    (2019.01)
   *H04L 9/32*     (2006.01)
   *G06N 3/08*     (2006.01)
   *H04L 9/00*     (2022.01)

(52) U.S. Cl.
   CPC ........... *G06Q 10/10* (2013.01); *H04L 9/3234* (2013.01); *G06Q 2220/00* (2013.01); *H04L 9/50* (2022.05)

(58) Field of Classification Search
   USPC ....................................................... 705/3–44
   See application file for complete search history.

(56) References Cited

U.S. PATENT DOCUMENTS

| | | | | |
|---|---|---|---|---|
| 10,454,683 | B2* | 10/2019 | Weimer | H04L 9/0618 |
| 10,944,563 | B2* | 3/2021 | Weimer | H04L 9/0618 |
| 11,100,743 | B1* | 8/2021 | Sealy | H04L 9/0825 |
| 2006/0143113 | A1* | 6/2006 | Bercovitz | G06Q 40/00 705/38 |
| 2008/0091625 | A1* | 4/2008 | Kremen | G06Q 50/06 705/412 |
| 2014/0344135 | A1* | 11/2014 | Steiner | G06Q 40/04 705/37 |
| 2015/0317728 | A1* | 11/2015 | Nguyen | G06Q 40/025 705/38 |
| 2017/0186116 | A1* | 6/2017 | Poll | G06Q 50/167 |
| 2018/0075527 | A1* | 3/2018 | Nagla | G06Q 40/025 |
| 2019/0303587 | A1* | 10/2019 | Hamel | H04L 9/30 |
| 2019/0319939 | A1* | 10/2019 | Hamel | H04L 9/3226 |
| 2021/0342836 | A1* | 11/2021 | Cella | G06K 9/6218 |

* cited by examiner

| Data Source | Internal/External Validation | Valuation | Income | Assets | Liabilities | Occupancy | Borrower Identity |
|---|---|---|---|---|---|---|---|
| Credit Report | External | | | X | X | X | X |
| Flood Certification | External | | | | X | | |
| Financial Statements | External | | X | X | X | X | X |
| 4506T Transcripts | External | | X | | | X | X |
| AVM Sources | External | X | | | | | |
| The Work Number | External | | X | | | | X |
| Fraud Report | External | X | | | X | X | X |
| Housing Price Index | External | X | | | | | |
| Distance Evaluation | External | | | | | X | |
| Pay Stubs | Internal | | X | | X | X | X |
| W2s | Internal | | X | | | X | X |
| Purchase Contract | Internal | | | | | X | |
| Appraisal | Internal | X | | | | X | |
| 1040 Personal Returns | Internal | | X | X | | X | X |
| 1040 Schedules A-F | Internal | | X | X | X | | |
| K-1s 1065 / 1120s | Internal | | X | X | X | | |
| Corporate 1120, 1065, 1120s | Internal | | X | X | X | | |

INTELLIGENT DATA MATCHING AND VALIDATION SYSTEM

CROSS REFERENCE TO RELATED APPLICATIONS

This application is a Non-Provisional Patent Application of, claims the benefit of, and priority to, U.S. Provisional Patent Application No. 62/811,179, filed on Feb. 27, 2019, and entitled "INTELLIGENT DATA MATCHING AND VALIDATION SYSTEM," the disclosure of which is incorporated by reference as if the same were set forth herein in its entirety.

TECHNICAL FIELD

The present disclosure relates generally to systems and methods for intelligently matching and validating data, and more specifically to systems and processes for leveraging predictive data modelling techniques for optimally matching and validating data.

BACKGROUND

Conventional systems and methods for underwriting are grossly inefficient and flawed. In general, traditional systems and methods for underwriting mortgage loans require a human underwriter for comparing information from a manually completed loan application document to guidelines established by potential investors or financial institutions, which allows for the underwriter to predict if that investor or financial institution may agree to provide capital to the loan applicant. Typically, the human underwriter will commit a relatively small portion of these guidelines to memory, thus ignoring other guidelines from potential investors/financial institutions and also increasing the opportunity for human risk. Moreover, humans are slow to appropriately evaluate the large quantities of data included in loan application documents, and thus inevitably create a bottleneck in the underwriting process. These problems, and others, propagate insufficiencies and inefficiencies throughout the underwriting process. Therefore, there exists a long-felt but unresolved need for systems and methods for intelligent underwriting.

BRIEF SUMMARY OF DISCLOSURE

The present systems and methods relate generally to intelligent underwriting techniques. According to various aspects of the present disclosure, the systems and methods discussed herein allow for a loan application (or other types of applications) to be intelligently processed such that the data included in the loan application is validated, the key underwriting elements are verified against known standards and the best possible financing match for the loan applicant is identified, thus allowing for a streamlined underwriting process, increased loan approvals, and minimized errors and/or loan rejections. As will be described in greater detail herein, the intelligent underwriting techniques are supported by comparative methodologies that enable the system to collect, analyze and underwrite data from multiple independent sources, conduct a comparative analysis that enables the system to determine the veracity of the data used in the application relative to that supplied by multiple external sources, and produce a supportable underwriting decision. The system may also guide the applicant through the document submission and other analyses needed to successfully and efficiently solicit the necessary information to perform the underwriting more efficiently and with greater authority than is possible today. In one embodiment, the system may be supported by quantum ledger databases ("QLDB") or blockchain technology, machine learning, Bayesian inference networks, and other technologies.

In various embodiments, the system includes one or more servers and/or computer processors configured to automatically receive data from third-party resources, such as investor guidelines provided by those investors who buy loans on the secondary market. In particular embodiments, these guidelines may determine how the underwriting engine should perform the tasks of validating (i.e. the information is from an appropriate source) and verifying (i.e. the information as presented faithfully represents the key underwriting elements, such as the borrower and/or the property). In certain embodiments, the system may query third-party resources, such as credit bureaus or bank statements, to certify a loan applicant's income, assets and liabilities. In other embodiments, the system may query vendors of property price information (e.g. AVM vendors) for up-to-date property value information. According to various aspects of the present disclosure, the systems and methods may implement QLDB/blockchain technology for providing an immutable record of a particular loan applicant's underwriting history. Moreover, the immutable ledger may be accessed by the lender and/or by those investors who wish to buy the lender's loans as part of the origination of loans and their sale on the secondary market to investors. In a particular embodiment, a QLDB is a ledger database that provides an immutable, cryptographically protected, and transparent transaction or activity log, that is owned by a central trusted party. According to various aspects of the present disclosure, QLDB's provide the technological advantages of a blockchain ledger without the requirement for issuing monetary incentives (e.g., coins) to decentralized ledger verifiers (e.g., miners). However, in certain embodiments, the system may issue monetary incentives, such as a currency or proprietary coin, in an entirely decentralized blockchain-like system, if appropriate. In one embodiment, the system may be distributed as middleware to be implemented at vendor systems, loan applicant systems, or both.

Accordingly, and in particular embodiments, the resulting system can underwrite a loan in milliseconds (or less), replacing a manual, complex, error prone task with a fully automated, accurate and highly intelligent one. At least one output of this system may be an underwriting document that clearly specifies the status of the loan with respect to established underwriting guidelines and, when appropriate, offers a pathway to funding and loan sale. In certain embodiments, the underwriting process performed by the system is accomplished in seconds (or less), with the output absorbing substantially less manpower while achieving a massively reduced level of defect. In various embodiments, the output is a valid, insurable underwriting document that is in every respect the equivalent of or superior to one produced manually by skilled underwriters.

In one embodiment, the present disclosure discusses a system including: a server including an append-only ledger; and a processor operatively connected to the server, wherein the processor is configured to: receive data from one or more third parties, wherein the data includes one or more financial loan elements identified as unsatisfactory by the one or more third parties; retrieve corresponding loan data from the append-only ledger at the server, wherein the corresponding loan data is retrieved via a unique token including encrypted information relating to an owner of the data; compare the one or more financial loan elements identified as unsatisfactory to the retrieved loan data for determining if the one or more loan characteristics are unsatisfactory; and automatically update one or more weighted coefficients corresponding to a Bayesian inference network based on the comparison, wherein each weighted coefficient corresponds in part to each of the one or more financial loan elements identified as unsatisfactory, and wherein the weighted coefficients are strengthened if the corresponding loan data falsifies the one or more financial loan elements identified as unsatisfactory.

In certain embodiment, the append-only ledger is a blockchain ledger. In particular embodiments, the append-only ledger is a QLDB ledger. In various embodiments, the data received from the one or more third parties includes data formatted in a Form 1003 mortgage application. In at least one embodiment, the corresponding loan data includes underwriting history associated with the received data. In a particular embodiment, the retrieved corresponding loan data includes published investor guidelines, and wherein the published investor guidelines are published to the append-only ledger by a particular third-party via an API providing permissioned access to the append-only ledger via a web portal. According to various aspects of the present disclosure, the retrieved corresponding loan data includes loan data not directed related to the received data from the one or more third parties. In certain embodiments, the loan data not directed related to the received data from the one or more third parties includes sample data corresponding to loans similar to the received data, and wherein the processor is further configured to generate a predictive data model based on the sample data for automatically update one or more weighted coefficients. Moreover, in one embodiment, the processor retrieves the sample data accordingly to an algorithm trained via deep learning technique.

In various embodiments, the present disclosure discusses a method, wherein via a processor operatively connected to a server including an append-only ledger, the processor is configured to execute the steps including: receiving data from one or more third parties, wherein the data includes one or more financial loan elements identified as unsatisfactory by the one or more third parties; retrieving corresponding loan data from the append-only ledger at the server, wherein the corresponding loan data is retrieved via a unique token including encrypted information relating to an owner of the data; comparing the one or more financial loan elements identified as unsatisfactory to the retrieved loan data for determining if the one or more loan characteristics are unsatisfactory; and automatically updating one or more weighted coefficients corresponding to a Bayesian inference network based on the comparison, wherein each weighted coefficient corresponds in part to each of the one or more financial loan elements identified as unsatisfactory, and wherein the weighted coefficients are strengthened if the corresponding loan data falsifies the one or more financial loan elements identified as unsatisfactory.

In certain embodiment, the append-only ledger is a blockchain ledger. In particular embodiments, the append-only ledger is a QLDB ledger. In various embodiments, the data received from the one or more third parties includes data formatted in a Form 1003 mortgage application. In at least one embodiment, the corresponding loan data includes underwriting history associated with the received data. In a particular embodiment, the retrieved corresponding loan data includes published investor guidelines, and wherein the published investor guidelines are published to the append-only ledger by a particular third-party via an API providing permissioned access to the append-only ledger via a web portal. According to various aspects of the present disclosure, the retrieved corresponding loan data includes loan data not directed related to the received data from the one or more third parties. In certain embodiments, the loan data not directed related to the received data from the one or more third parties includes sample data corresponding to loans similar to the received data, and wherein the processor is further configured to generate a predictive data model based on the sample data for automatically update one or more weighted coefficients. Moreover, in one embodiment, the processor retrieves the sample data accordingly to an algorithm trained via deep learning technique.

These and other aspects, features, and benefits of the disclosed technology will become apparent from the following detailed written description of the preferred embodiments and aspects taken in conjunction with the following drawings, although variations and modifications thereto may be effected without departing from the spirit and scope of the novel concepts of the disclosure.

BRIEF DESCRIPTION OF DRAWINGS

The accompanying drawings illustrate one or more embodiments and/or aspects of the disclosure and, together with the written description, serve to explain the principles of the disclosure. Wherever possible, the same reference numbers are used throughout the drawings to refer to the same or like elements of an embodiment. A brief description of the drawings are provided below, wherein.

DETAILED DESCRIPTION OF DRAWINGS

For the purpose of promoting an understanding of the principles of the present disclosure, reference will now be made to the embodiments illustrated in the drawings and specific language will be used to describe the same. It will, nevertheless, be understood that no limitation of the scope of the disclosure is thereby intended; any alterations and further modifications of the described or illustrated embodiments, and any further applications of the principles of the disclosure as illustrated therein are contemplated as would normally occur to one skilled in the art to which the disclosure relates. All limitations of scope should be determined in accordance with and as expressed in the claims.

The present systems and methods relate generally to intelligent underwriting techniques. According to various aspects of the present disclosure, the systems and methods discussed herein allow for a loan application (or other types of applications) to be intelligently processed such that the data included in the loan application is validated, the key underwriting data elements (e.g. income, assets, liabilities, etc.) are verified against known standards and the best possible financing match for the loan applicant is identified, thus allowing for a streamlined underwriting process, increased loan approvals, and minimized errors and/or loan rejections. As will be described in greater detail herein, the intelligent underwriting techniques may be supported by quantum ledger databases ("QLDB") or blockchain technology, machine learning, artificial intelligence ("AI"), Bayesian inference networks, and other technologies. In various embodiments, the machine learning/AI techniques may include translating logical outputs of the intelligent underwriting engine into empirically derived estimates of key underwriting events, such as but not limited to the likelihood of defect using a Bayesian inference network. Furthermore, in a particular embodiment, the system establishes cause-and-effect networks that relate attributes (e.g., income verification) with the likelihood of an outcome, such as valid income. In certain embodiments, the Bayesian inference network may be self-learning and, given the appropriate cause-and-effect network, may update its modeling coefficients automatically over time. In at least one embodiment, the system uses deep learning techniques for determining how elements of a loan application will affect the loan quality. According to various aspects of the present disclosure, deep learning techniques are machine methodologies that leverage additional information to further distinguish amongst modeling cases (e.g. borrowers) and past trend information to produce estimates of greater accuracy and reliability.

In various embodiments, the system includes one or more servers and/or computer processors configured to automatically receive data from third-party resources, such as investor guidelines provided by those investors who buy loans on the secondary market. In particular embodiments, these guidelines may determine how the underwriting engine should perform the tasks of validating (i.e. the information is from an appropriate source) and verifying (i.e. the information as presented faithfully represents the key underwriting elements, such as the borrower and/or the property). In certain embodiments, the system may query third-party resources, such as credit bureaus or bank statements, to certify a loan applicant's assets and liabilities. In other embodiments, the system may query vendors of property price information (e.g. AVM vendors) for up-to-date property value information. According to various aspects of the present disclosure, the systems and methods may implement QLDB/blockchain technology for providing an immutable record of a particular loan applicant's underwriting history. In a particular embodiment, a QLDB is a ledger database that provides an immutable, cryptographically protected, and transparent transaction or activity log, that is owned by a central trusted party. According to various aspects of the present disclosure, QLDB's provide the technological advantages of a blockchain ledger without the requirement for issuing monetary incentives (e.g., coins) to decentralized ledger verifiers (e.g., miners). However, in certain embodiments, the system may issue monetary incentives, such as a currency or proprietary coin, in an entirely decentralized blockchain-like system, if appropriate. In one embodiment, the system may be distributed as middleware to be implemented at vendor systems, loan applicant systems, or both.

Figure 1:
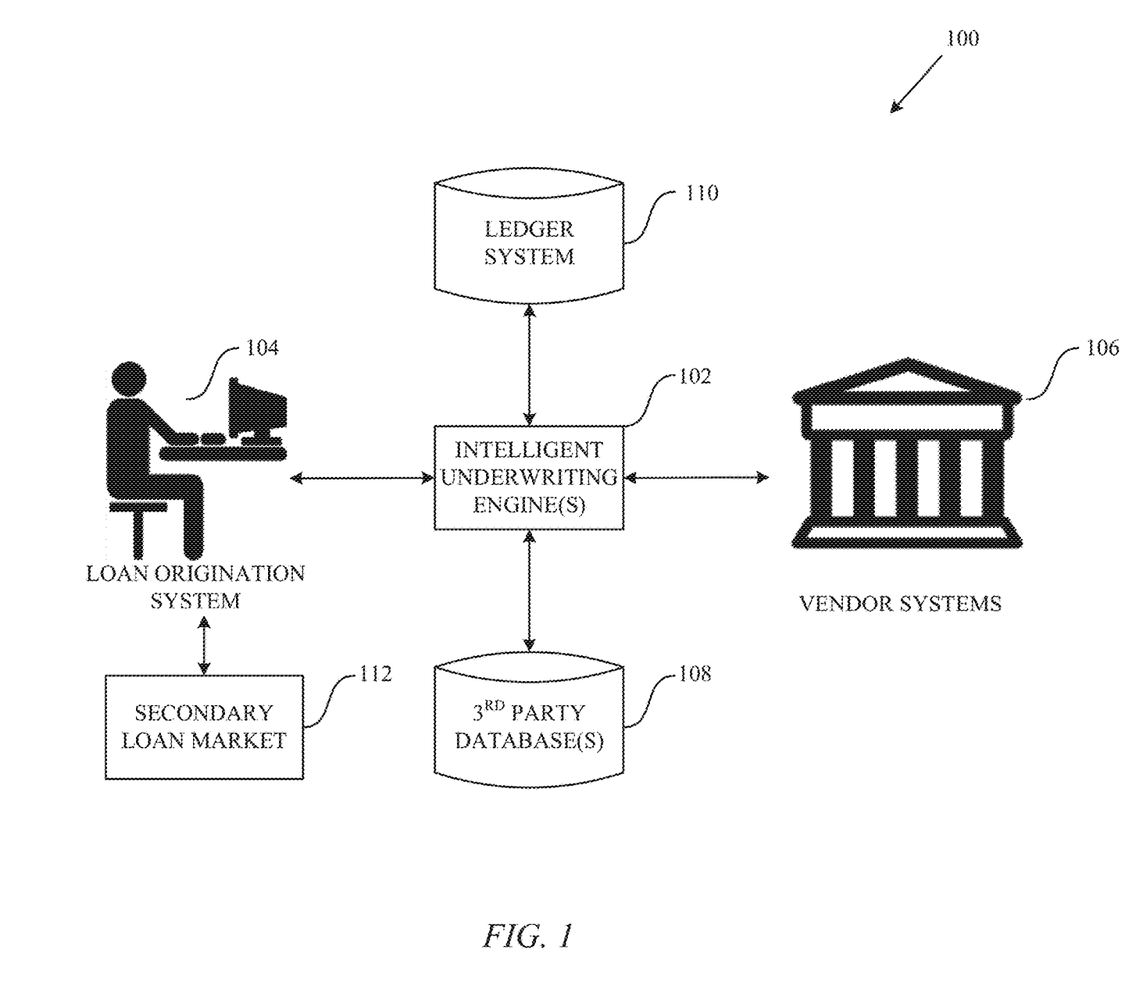
FIG. 1 is a diagram of an exemplary system environment, according to one aspect of the present disclosure.

Referring now to the drawings, FIG. 1 is an exemplary system environment diagram, according to one aspect of the present disclosure. In various embodiments, the system includes one or more intelligent underwriting engines 102 which are operatively connected to a loan origination system 104, vendor systems 106, one or more third-party databases 108, and a ledger system 110. According to various aspects of the present disclosure, the one or more intelligent underwriting engines 102 allow for loan applications originated by a plurality of individuals or organizations to be optimally matched with a particular vendor or vendor "product". For example, each vendor or vendor system 106 (e.g., a bank, financial institution, investor, interested party, lender, etc.) may include various options for satisfying loan applications. In one embodiment, the systems and methods discussed herein allow not only for loan applications to be matched with particular vendors, but also allow for the loan applications to be matched with the various products and options offered by those vendors.

As will be discussed in greater detail herein, the one or more intelligent underwriting engines 102 may validate and verify each data element included in a loan application and furthermore compare, using a variety of analytical methodologies, those data elements to guidelines published by potential lenders in the vendor system, thereby allowing the one or more intelligent underwriting engines 102 to determine an optimal investor/vendor for a particular loan application. According to various aspects of the present disclosure, the system may automatically and periodically retrieve the investor guidelines (e.g., via APIs accessing the locations at which the guidelines are stored/published), or the system may provide investors with a portal (e.g., a web portal) for submitting updated guidelines. In certain embodiments, in response to receiving new investor guidelines, the system may automatically generate sample loan data for determining how the updated guidelines may impact future loan processing, and the system may furthermore update/reweight the appropriate Bayesian inference network coefficients accordingly. In various embodiments, the loan origination system 104 may be operatively connected to a secondary loan market 112, thus allowing for approved loans to be sold to financial institutions.

In certain embodiments, the one or more intelligent underwriting engines 102 provide a middleware software solution to bankers, underwriters, or loan applicants. In various embodiments, the one or more intelligent underwriting engines 102 may be installed as software packages operable to execute on processors at computing systems maintained by the bankers, underwriters, or loan applicants.

In various embodiments, the intelligent underwriting engine 102 may be in operative communication with one or more vendor systems 106 via APIs, or similar methods for electronically communicating with computer-based systems. In particular embodiments, the intelligent underwriting engine 102 may access the third-party databases 108 via APIs as well. According to various aspects of the present disclosure, the vendor systems 106 may include internal/local databases or servers from which the intelligent underwriting engine 102 may access data, or the third-party databases 108 may be data repositories separate from the vendor systems 106 (for reasons such as security) from which the intelligent underwriting engine 102 may access data.

In particular embodiments, the ledger system 110 may allow for each step of the loan underwriting process to be appended to a QLDB or a blockchain ledger, thus allowing for an immutable record of the underwriting process that may follow each loan from origination to sale on the secondary market. According to various aspects of the present disclosure, information stored in the ledger may be requested and accessed via a token. In various embodiments, a token is a cryptographic and/or encrypted key corresponding to particular data in the ledger. In certain embodiments, the ledger owner or administrator may provide tokens to investors that purchase loans, where data associated with the loan (e.g., the underwriting history) is stored in the ledger. Accordingly, via the token (and in some embodiments, only via the token), the loan owner may request and/or directly access the loan data from the ledger.

Figure 2:
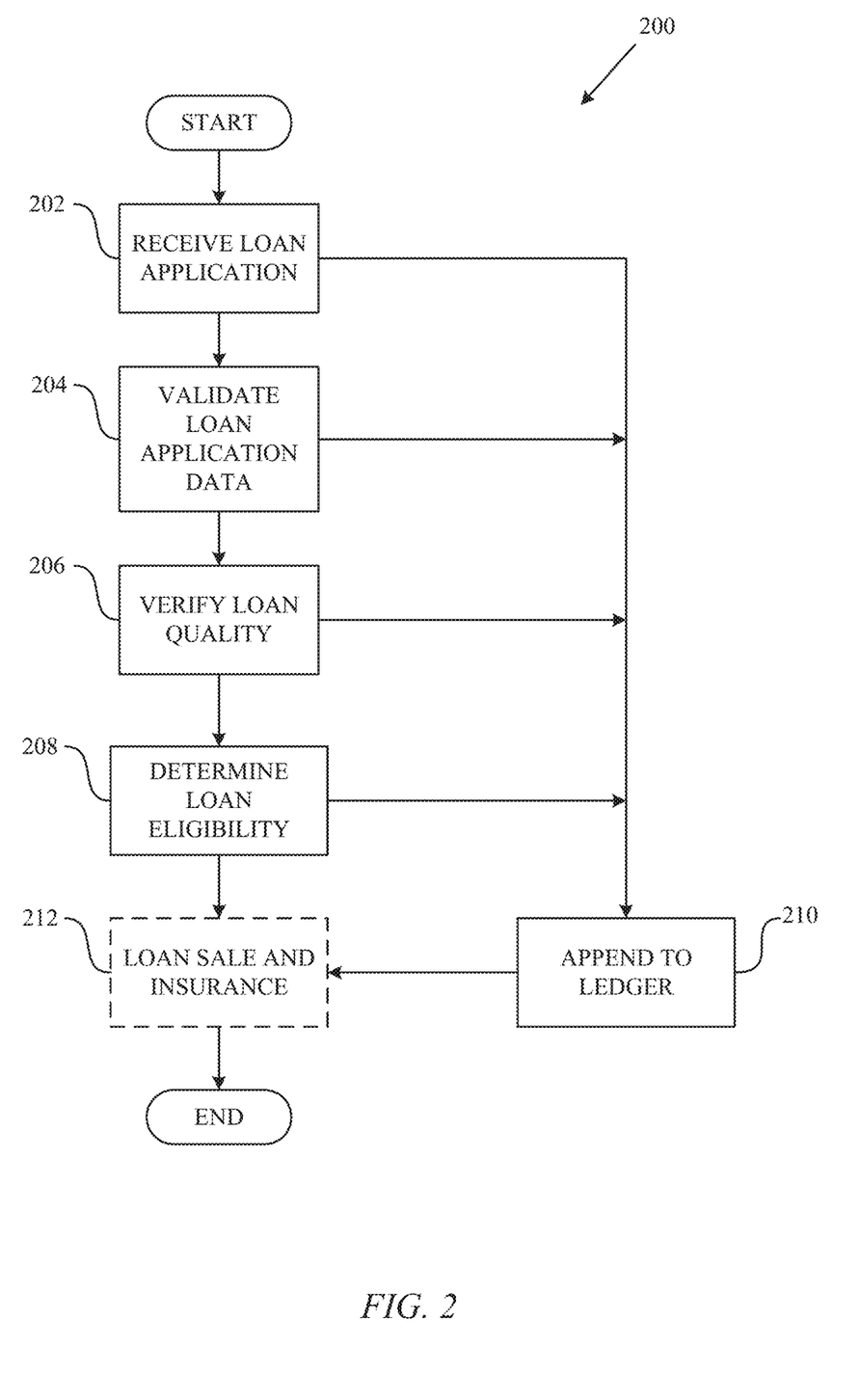
FIG. 2 is a flowchart of an exemplary overall system process, according to one aspect of the present disclosure.

In one embodiment, FIG. 2 is a flowchart depicting an exemplary system process 200. In a particular embodiment, the process 200 begins at step 202, where the intelligent underwriting engine 102 receives a loan application (from the loan origination system 104). In various embodiments, the loan application may be a loan application to purchase a home, or any other asset, which may include personal and financial data relating to the loan applicant. In some embodiments, the loan application may be generated via a computing device, such as a mobile phone or personal computer included in the loan origination system 104. In other embodiments, the loan applicant may manually complete a loan application and the loan application may further be digitized.

In various embodiments, and in response to receiving the loan application data, the process 200 may proceed to step 204 where the system, via the intelligent underwriting engine 102, validates the loan application data. According to various aspects of the present disclosure, validating the loan application data may include identifying or parsing the loan application data to detect information that may be fraudulent, inaccurate, or generally misleading. For example, a loan applicant may falsely report his/her income based on outdated documentation. In conventional underwriting processes, if this detail was overlooked by an underwriter, the loan applicant may be approved for a loan of a greater amount than he/she could reasonably afford, or the loan application may be denied by the target financial institution which may result in wasted funds and time. In certain embodiments, aspects of the present systems and methods allow for each and every data element of the loan application to be analyzed and verified. In one embodiment, the system achieves this improvement via predefined "intelligent acts."

In a particular embodiment, an intelligent act may be a series of steps or instructions for verifying a data element included in the loan application. For example, a particular intelligent act may include verifying a loan applicant's provided address, and duration at said address, by comparing the provided information to utility records or the like. In various embodiments, and as will be discussed in greater detail below, this comparison and other related comparisons are often conducted using logical methodologies that not only determine exact matches, but can also make determinations that two income values, for example, are consistent and supportive, even though they do not match exactly or aspects surrounding the sourcing of the information may involve additional complexity. In various embodiments, the present systems and methods consider thousands (or more) intelligent acts at step 204 while validating the loan application data. In particular embodiments, the system may include a stored table of intelligent acts where each intelligent act in the table is processed during the step 204, or the intelligent underwriting engine 102 may identify aspects of the loan application that allow for the system to determine an optimal first intelligent act to execute, which may allow for the system to quickly identify inaccurate or otherwise false loan data without the need to execute every predefined intelligent act.

According to various aspects of the present disclosure, the system may leverage Bayesian inference networks to predict loan characteristics or underwriting outcomes. As will be understood by one of ordinary skill in the art, Bayesian inference networks allow for statistical models to represent conditional dependencies between parameters or variables. In particular embodiments, the Bayesian inference networks may provide insight into which intelligent acts should be executed based on prior intelligent acts. In other embodiments, if the system determines that an applicant's income is reported to be substantially higher than can be supported by relevant documents and analysis as conducted by the Bayesian inference network, such as an automated cash flow analysis of the applicant's bank statement, the loan applicant's stated income may be determined to be false. In various embodiments, the system may "condition" that loan by requesting additional income documentation from the applicant. Should that additional documentation, through a process of comparative analysis conducted by the Bayesian inference network, also find the income as represented to be false, then the system may request that the applicant's application be appropriately adjusted or if that is not possible, the system may recommend that the loan be "suspended" and transmit a turn down request. According to various aspects of the present disclosure, if the applicant's income can be resuscitated, the application may proceed as amended, possibly resulting in a funded loan.

Continuing with step 204, the system may determine that particular elements of the loan data (e.g., data extracted from a Form 1003) are false and/or fraudulent. In some embodiments, in response to detecting the false and/or fraudulent data, the system may request additional data from the loan originator (e.g., establishing a "condition" for the applicant to satisfy, as mentioned immediately above) for verifying the loan data.

In one embodiment, in response to validating the loan application data, the intelligent underwriting engine 102 may further verify the loan "quality," or appropriateness, at step 206. For example, the loan applicant my represent that the subject property intended for purchase has a value of $350,000, and that value may even be supported by an appraisal. In various embodiments, the system, through a comparative analysis based upon external data, such as the values output by numerous Automated Valuation Models (AVM's), may estimate using empirically derived comparative methods that the property value has been materially overstated. If the property value has been materially overstated, the system may recommend that the loan be suspended or that the property value and loan amount be restated to conform to a more likely property value. For example, the system may query three separate and independent AVM sources (or any appropriate number of sources) for determining the "fair price" of the home. Accordingly, if the AVMs return valuations that are in line with the loan amount (e.g., within an average price threshold amount) then the loan application data is likely verifiable, and if the AVM-determined prices are substantially off-mark (e.g., outside of the average price threshold) then the loan application data may require further review. In certain embodiments, the system may query one or more AVM sources in near real-time for acquiring appraisal data, or the system may include proprietary functions and databases for calculating appraisal values.

In particular embodiments, at step 206, the system may retrieve data from recognized and trusted third parties for verifying the loan quality. For example, the system may retrieve data from a payroll company such as ADP for using a paystub to verifying a borrower's income. In various embodiments, the system may retrieve data from banks (given the applicant's permission) and from companies such as Equifax, Experian, and CoreLogic for verifying a borrower's assets, liabilities, his/her identity, property value, and the occupancy intentions (e.g., primary residence or rental property). According to various aspects of the present disclosure, the system may use data visualization methods such as OCR for comparing the externally retrieved data to the data included in a loan application.

In various embodiments, the system may use logical tests, statistical tests, or algorithmic tests for verifying the data. For example, a logical test may include a binary test determining if the borrower's employer stated on his/her paystub matches the employer listed in the loan application. In another example, a logical test for verifying and/or validating loan data received from vendor systems may include adaptive, or "fuzzy," logic. In various embodiments, the system, via this adaptive logic test, may avoid determining false negatives when evaluating loan application data, or related data, by processing not just what is determined to be included in the loan application data, but also by comparing the loan data to other possible meanings or representations of the data. For example, the adaptive logic may be configured to identify semantic meanings attributed to text that may be easily recognizable and understandable to a human reader, but may be difficult for a computer to accurately detect. For example, the system recognizes that "st." and "street" have the same meaning when referring to a street address, that "AFB" may be an acceptable representation of "Air Force Base," and even recognizing more complex text strings such as recognizing the semantic equivalence between "HP" and "Hewlett-Packard."

In various embodiments, the adaptive logic is configured to determine a linguistic distance between the data included in the received loan application data and the expected, stored, or received/retrieved data being used to evaluate the loan application, such as the applicant's provided pay stub. The system furthermore determines if the linguistic distance is within an allowable threshold range, for determining if variations in the loan application data are indeed correct and allowable. According to various aspects of the present disclosure, the system may determine what linguistic distances are within an allowable threshold range by training machine learning models using deep learning techniques, where the training includes providing the machine learning models with historical loan application data (or any other text, numerical data, or linguistic data) for processing the provided data to identify and establish relationships between elements of the data. For example, the adaptive logic may recognize and establish equivalence between the capital letters of "Air Force Base" and those in the string "AFB," as the adaptive logic may include a thread of logic in which it established a substantially high correlation between capital letters in noun names and the letters included in acronyms.

In one embodiment, the system may use statistical tests for verifying a borrower's income, as incomes generally fluctuate based on various factors. For example, the system may compare a borrower's listed income to an income figure pulled from one or more external sources, but the system may allow for the compared incomes to vary within a predetermined threshold (e.g., the borrower's listed income may vary by 1.96 standard deviations, it may vary within the 95th percentile, etc.). In other embodiments, the system may also use a machine learning algorithm trained via deep learning methods for verifying the loan data. In certain embodiments, the deep learning algorithm may be trained via one or more model data samples including historical loan applications, and the deep learning algorithm may generate predicted outcomes based on the model training set. The deep learning algorithm estimates the relevant value, such as income or assets, and that estimate is used to verify the appropriate value in the application.

Proceeding now to step 208, the system may determine the loan eligibility, according to various aspects of the present disclosure. In one embodiment, the system, via the intelligent underwriting engine 102, may determine the loan eligibility by comparing particular data elements from the loan application to a plurality of investor guidelines. These investor guidelines, in particular embodiments, may include publicly available rules or conditions that determine if a particular loan application is purchasable by a given loan buyer (i.e. investor). For example, an investor (e.g., a pension fund) may require loan applicants to have FICO credit scores over 700 and to have a debt-to-income ratios below a certain threshold in order to qualify (be eligible) to be purchased by this investor. Accordingly, each investor may publish guidelines for sets of loan products (e.g. conventional loans, 30-Year, FIXED v. conventional loan, 15-Year, FIXED etc.) and include hundreds of separate guidelines for each loan product set, creating a matrix of dozens (or more) of product sets, with hundreds (or more) of guidelines per set. In a typical lending operation, the underwriter may have at his/her disposal an entire portfolio of investor product set guidelines and be substantially challenged to determine which investor product set guidelines would be most appropriate for a given applicant and attempt to underwrite to that particular investor product set of guidelines. Investors and financial institutions generally update their product set guideline structure frequently as economic factors change (e.g., to adjust for lending rates, inflation, etc.), which creates a scenario where it is impossible for a loan underwriter to evaluate and compare each element of a loan application to each set of product guideline sets. It is estimated that any given lender may entertain a portfolio of over sixty investor product sets equating to over six-thousand individual guidelines (one-hundred, or more, per investor product set). As such, current methods of loan underwriting are merely guesses, rather than empirically backed decisions. In particular embodiments, the present systems and methods allow for each data element of a loan application to be compared to each available guideline from every available investor, thereby optimizing likelihood of loan eligibility (and sale if funded). In some embodiments, the system may automatically update as new investor guidelines are released.

In further embodiments, and after each above step of the process 200, the system may append a record of the loan underwriting activities (e.g., steps 202-208) onto a ledger at step 210. In various embodiments, appending the underwriting history to a ledger allows for potential loan buyers to view each step taken for underwriting the loan, which provides a degree of assurance to a loan buyer that is otherwise not obtainable.

In certain embodiments, the system may optionally allow for loans to be sold on a secondary market, or for insurance policies to be sold on the loans, at step 212. In particular embodiments, a sale of a loan on the second market, or sale of an insurance policy, may also be included on the ledger associated with the particular loan.

Figure 3:
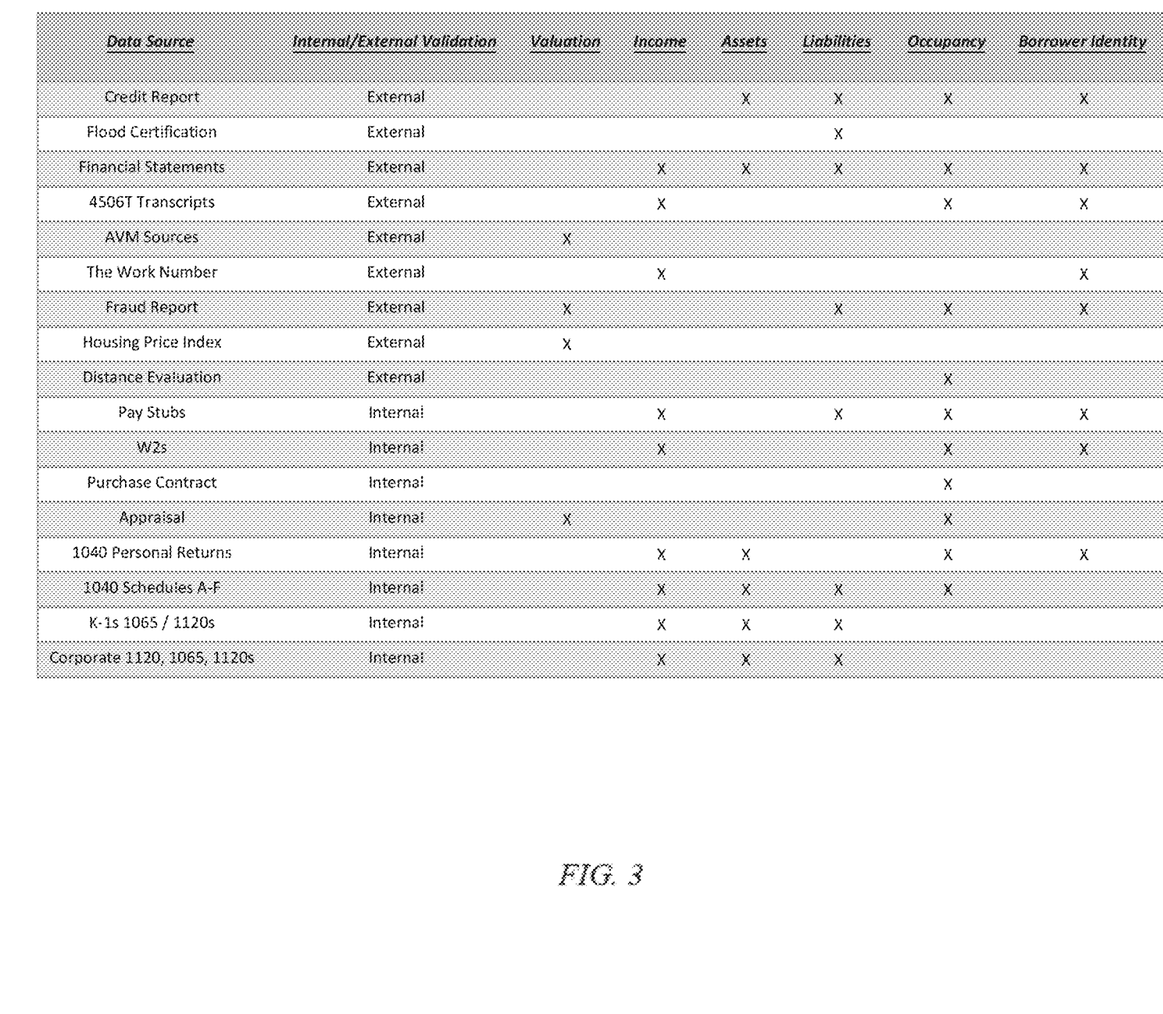
FIG. 3 is a table including exemplary validation and verification source data, according to one aspect of the present disclosure.

Turning now to FIG. 3, a table including exemplary validation and verification data is shown, according to one aspect of the present disclosure. In various embodiments, the table illustrates various data sources for validating and verifying loan applications (or other types of applications), and how data from those sources may be used for validating and verifying. For example, the data sources may include credit reports, and the available credit reports may provide data for verifying an applicant's assets and liabilities, as well as the applicant's occupancy and borrower identity (indicated in the rows and columns of the table as an "X"). In one embodiment, the data sources corresponding to the table illustrated in FIG. 3 may be queried for the indicated available data, allowing for internal and/or external validation and verification of application information via the methods discussed herein.

Figure 4:
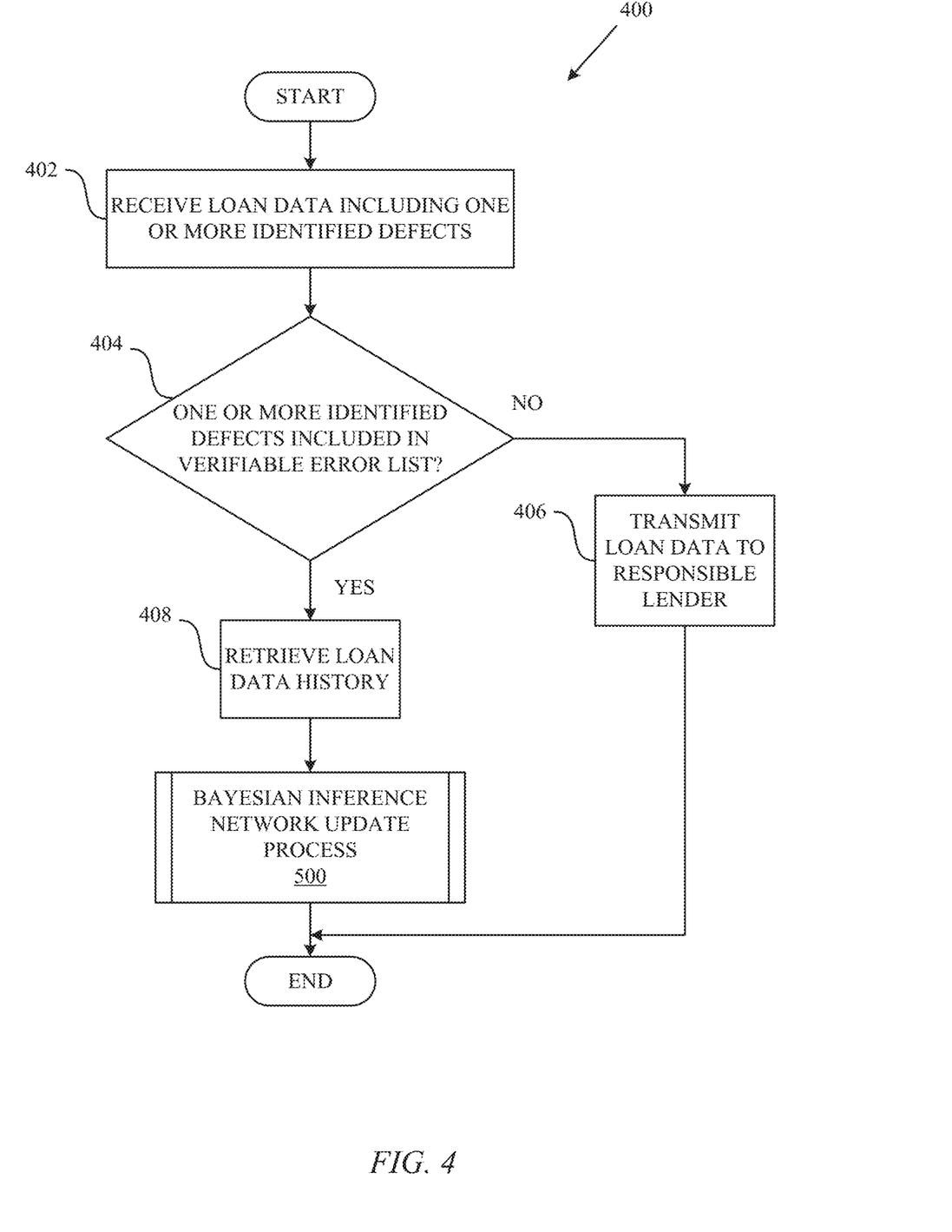
FIG. 4 is a flowchart of an exemplary application quality management process, according to one aspect of the present disclosure.

In one embodiment, FIG. 4 is a flowchart of an application quality management process 400. In particular embodiments, the embodiment discussed in association with FIG. 4 relates to applications, such as loan applications, that have already been approved. Accordingly, the process 400 generally evaluates and determines the quality of existing loan data.

In various embodiments, the process 400 begins at step 402, where the system receives, from a third-party, loan data including one or more identified defects or errors in the loan data. In certain embodiments, the loan data is received in a predetermined format, such as a loan repurchase demand (or the like), where the third-party is demanding the loan be repurchased from the third-party lender for including the defects. In response to receiving the loan data including the one or more identified defects or errors in the loan, the system confirms that the defects or errors are in fact defects or errors. In one embodiment, the defects may include incorrect income or property appraisal information, or any other appropriate type of information included in loan data.

Figure 5:
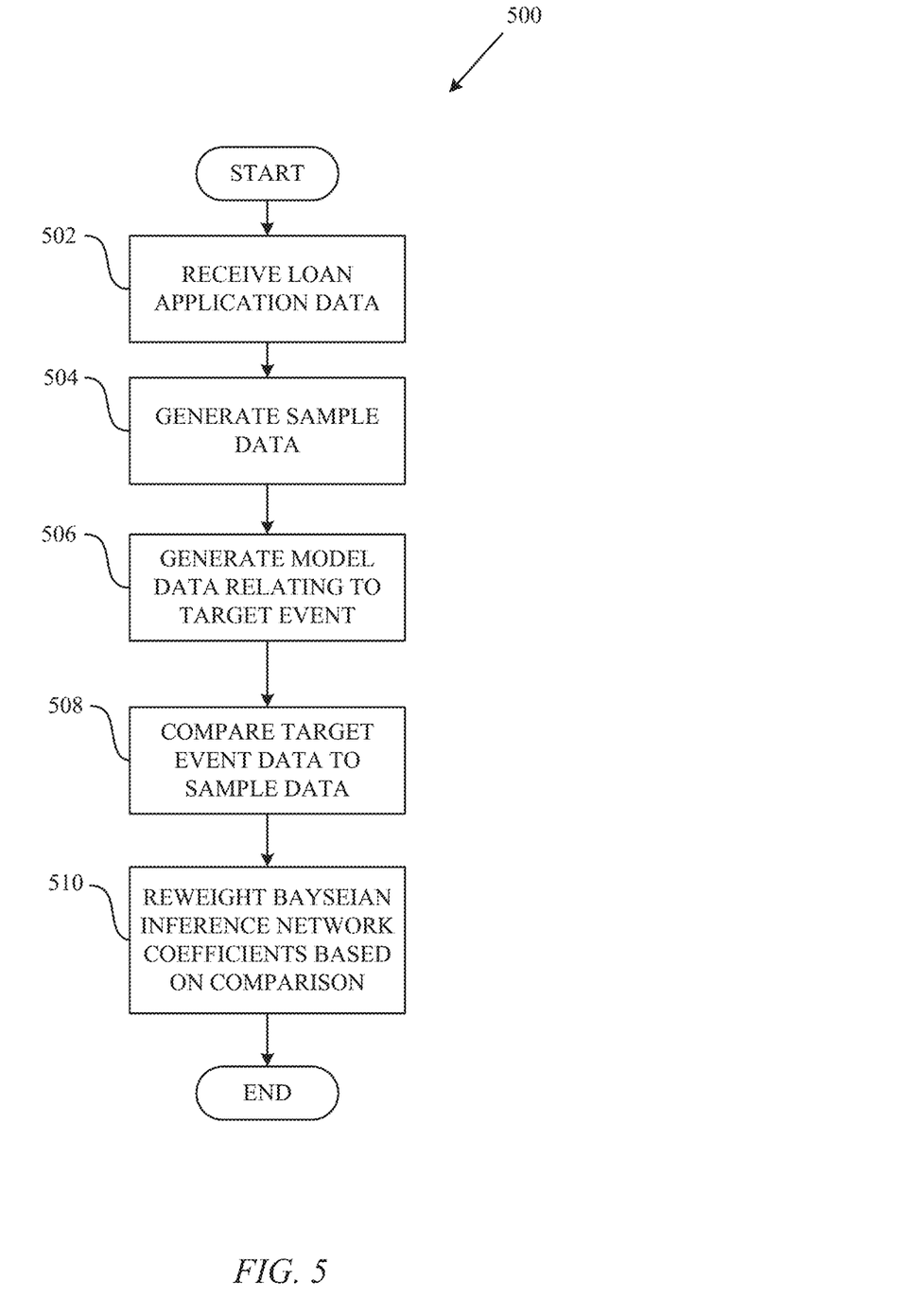
FIG. 5 is a flowchart of an exemplary Bayesian inference network update process, according to one aspect of the present disclosure.

Proceeding to step 404, the system determines if the identified errors or defects are included in a predetermined list of errors or defects verifiable by the system, and in some embodiments, insurable by the system. Referring back to the discussion associated with the embodiment in FIG. 1, the system leverages Bayesian inference networks for determining if a particular loan is likely to include errors/defects, or if it is likely to be identified or flagged as including errors/defects. In the present embodiment, if the identified errors are not included in the predetermined list of verifiable errors, at step 406 the system may transmit the loan data to the lender responsible for issuing the loan. However, if at step 404 it is determined that the identified errors are included in the predetermined list of verifiable errors, the system proceeds to step 408 and retrieves the full history relating to the loan for analyzing the loan history in light of the identified defects. In various embodiments, the system may retrieve the loan history from a third-party (such as the lender responsible for issuing the loan), or the system may include its own copy of the loan history stored in the ledger, or another system database. In one embodiment, the process then 400 proceeds to the sub-process 500, to be described in greater detail immediately below.

FIG. 5 is a flowchart of the Bayesian inference network update process, according to one aspect of the present disclosure. In various embodiments, the system leverages one or more Bayesian inference networks for predicting outcomes based on particular system inputs or parameters. In the present embodiment, the one or more Bayesian inference networks include weighted coefficients corresponding to particular inputs or parameters, where the coefficients relate to the likelihood of the input or parameter affecting the loan (e.g., if the input or parameter is likely to be identified as an error or defect).

In one embodiment, the process 500 begins at step 502, where the system receives the data to be used for updating the Bayesian inference networks. In various embodiments, this data is generally data received from third parties, such as data included in loan repurchase requests. However, the data received at step 502 may also include loan histories or underwriting data for comparing evaluating the data from the loan repurchase requests.

In a particular embodiment, at step 504, the system generates a data sample based on the particular data being compared or evaluated (the data received at step 502), and where the data sample is for updating the one or more Bayesian inference networks. For example, at step 504, the data sample may include a portion of the loan data received at step 402 as well as data from the loan history retrieved at step 408 or other non-related loans stored in the system ledger. In other embodiments, the data sample may include data relating to underwriting data, investor guidelines, if the loan has been sold (or if it is likely to be sold), if similar loans have historically sold, etc. In at least one embodiment, the data sample generated at step 504 may include data unrelated to the data being compared or evaluated, so that the data sample is a control for the particular data being evaluated to be compared against. For example, the data sample may include various instances of loans similar to a particular loan in question, where a portion of the various instances of loans were determined to include valid defects, and others were determined not to include valid defects.

In various embodiments, the process 500 proceeds to step 506, where the system generates model data relating to a particular target event, based on the data sample generated at step 504. In a particular embodiment, the system extracts raw data from the data sample (e.g., identified errors from a repurchase request), and generates a data model for determining if the repurchase agreement is valid (e.g., if the defects or errors identified therein are valid defects). For the purposes of explanation, the target event may be determining if a repurchase request, citing one or more loan defects, is a valid request.

In certain embodiments, at step 508, the system compares the model data relating to the particular target event to the data sample generated at step 504, and furthermore determines if the particular target event is valid or not, based on the particular data sample. In various embodiments, regardless of the comparison at step 508, the system may reweight the one or more Bayesian inference networks based on the comparison outcome (step 510).

Figure 6:
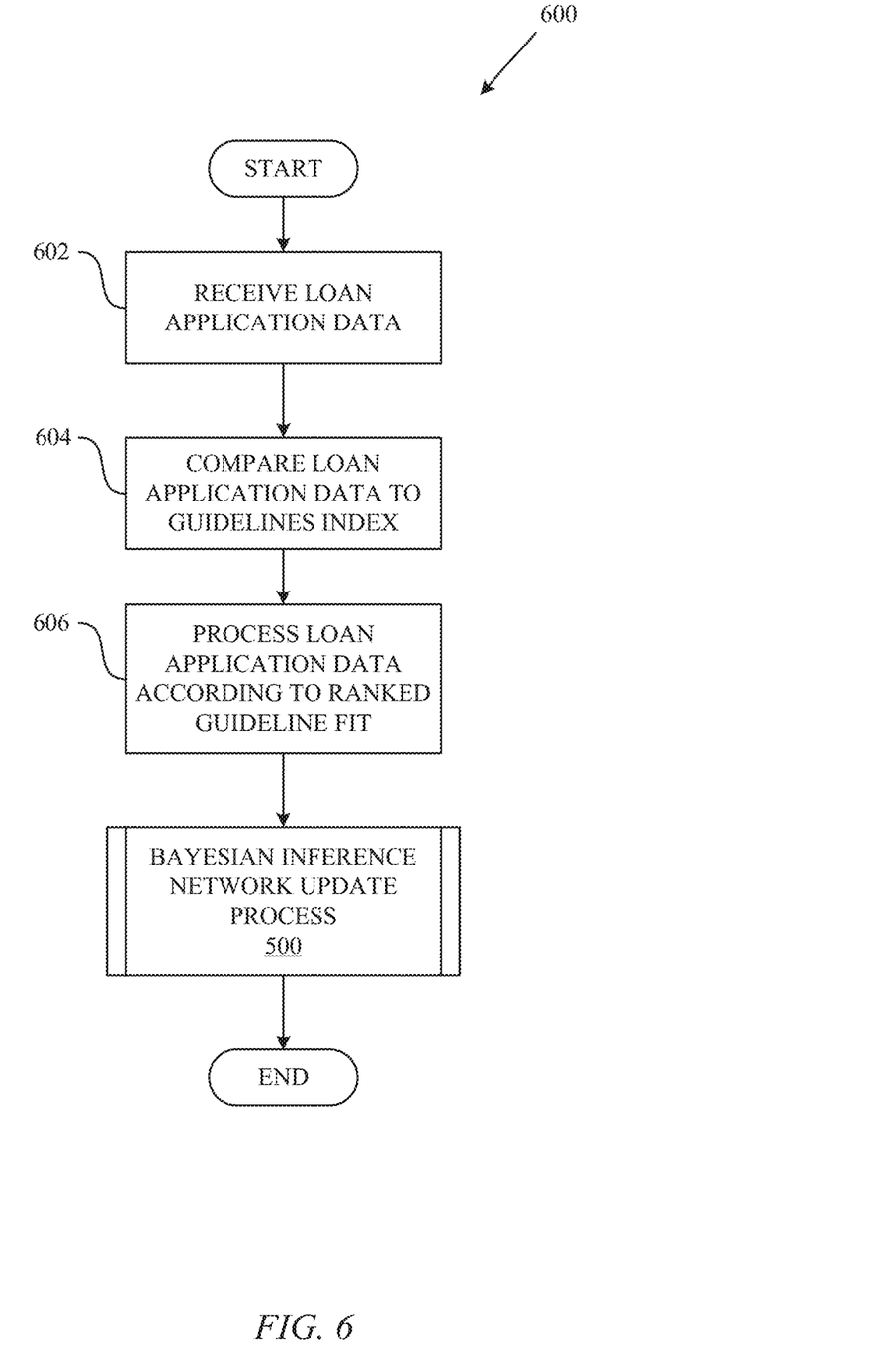
FIG. 6 is a flowchart of an exemplary loan prediction process, according to one aspect of the present disclosure.

Turning now to FIG. 6, a loan prediction process 600 is shown, according to one aspect of the present disclosure. In one embodiment, the loan prediction process determines, based on data received in a loan application and historical loan data, how likely a loan is to be approved by various lenders.

In a particular embodiment, the process 600 begins at step 602, where the system receives loan data (e.g., a loan application). In various embodiments, the loan data may be in the format of a Form 1003, a Fannie 3.2 file, or another appropriate format. In one embodiment, at step 604 the system may proceed to compare the loan data received at step 602 to a database of investor guidelines. As discussed above in association with FIG. 1, the investor guidelines may include publicly available rules or conditions that determine if a particular loan application is serviceable by a particular lender. For example, an investor (e.g., a bank) may require loan applicants to have FICO credit scores over 700 to qualify for a loan if his/her debt-to-income ratio is above a certain threshold. Continuing with step 604, in certain embodiments, the system may compare the loan data to the investor guidelines and furthermore rank the investors based on the number of criteria satisfied by the loan data. According to various aspects of the present disclosure, the system may leverage the one or more Bayesian inference networks for predicting which investors are most likely to result in a successful transaction based on the loan data parameters.

In various embodiments, the system proceeds to step 606, where the particular loan application is processed according to the highest ranked investors from the comparison at step 604. In particular embodiments, the system records if the highest-ranked investor resulted in a closing (and subsequent selling) of the loan. In certain embodiments, the system may also record metrics such as how long the closing (and subsequent sale) took, and other appropriate metrics.

In at least one embodiment, the process 600 may proceed to the sub-process 500, where data from step 602, 604, and/or step 606 may furthermore be used as parameters for updating and/or reweighting the coefficients of the Bayesian inference networks.

Figure 7:
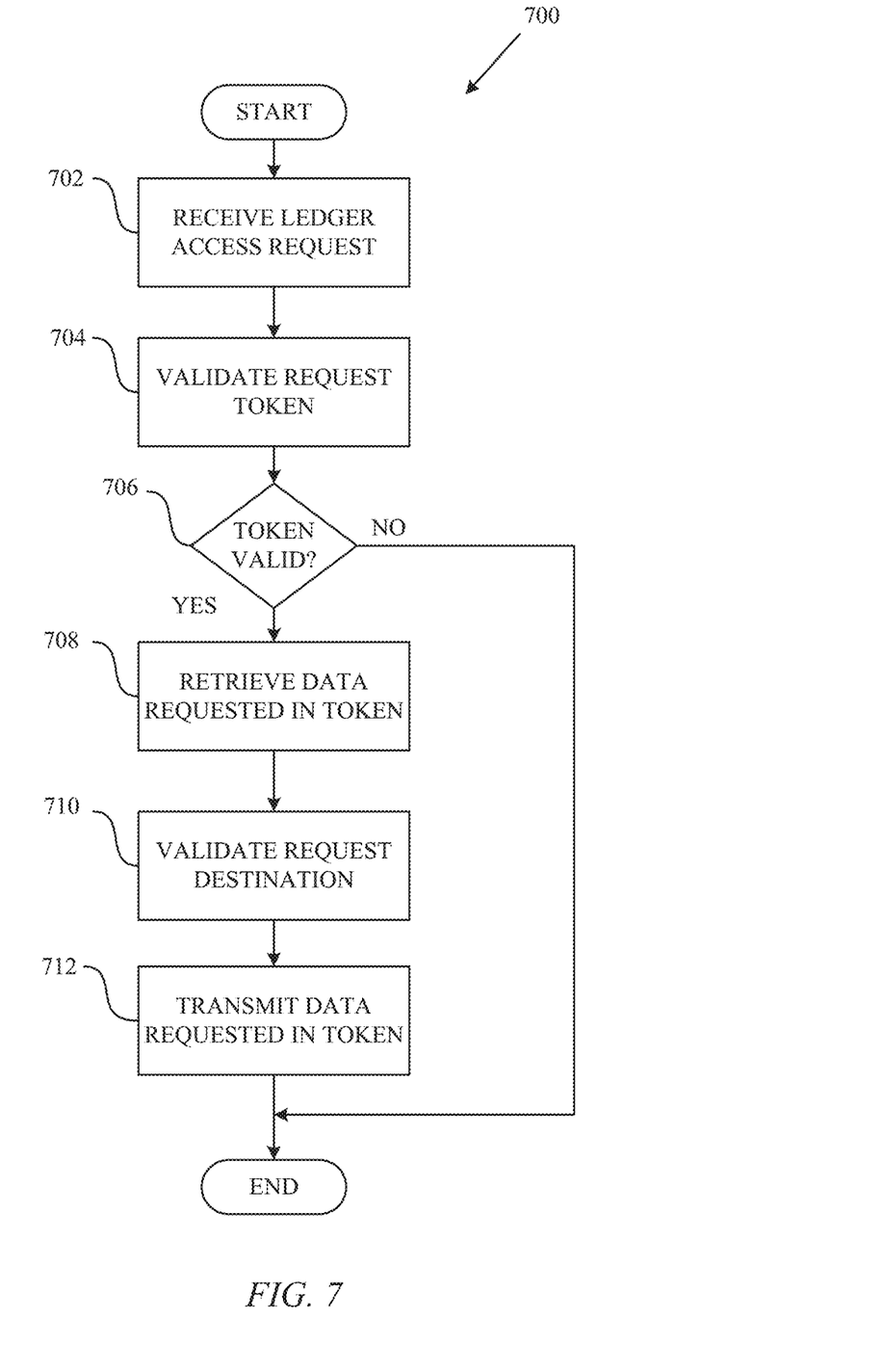
FIG. 7 is a flowchart of an exemplary ledger access process, according to one aspect of the present disclosure.

Turning now to FIG. 7, a system ledger access process 700 is shown, according to one aspect of the present disclosure. As discussed above in association with the embodiment shown in FIG. 1, the system may include an immutable ledger such as a blockchain ledger or a QLDB. Accordingly, in a particular embodiment, the present disclosure includes a novel method for allowing data to be accessed or retrieved from the ledger using tokens. In various embodiments, the process 700 begins at step 702, where the system receives a request from a third-party (e.g., a lender), requesting data from the ledger. Embodiments of the system discussed herein solve the issue of inefficiency related to requiring a system administrator to receive the requested data by instead allowing for the requesting party to submit in their request a token. In certain embodiments, the token received at step 702 includes encrypted or cryptographic information corresponding to the third parties particular access rights with respect to the ledger.

In one embodiment, at step 704, the system automatically validates the token included in the request. According to various aspects of the present disclosure, validating the token includes comparing the token to a list of issued tokens, where the list of issued tokens may also be encrypted so that the list itself cannot be used for accessing the data stored in the ledger. In various embodiments, the token may include encrypted data representative of at least: the particular loan data being requested; the particular elements of the loan data (if not the entirety of the loan data); the requestor's purpose for accessing the data; a predetermined time at when the data is to be accessed; for how long the data is to be accessed, or how long the permission to access is to be valid; how the particular data is to be accessed; a ranking officer of the requesting party; a ranking party of the data owner; and, a permission level which may be used for determining access rights. In certain embodiments, if at step 706 the system determines that the token is not valid, the system may reject the access request; however, if, at step 706, the token is determined to be valid, the system may proceed to step 708.

In various embodiments, at step 708, the system retrieves the particular data requested via the token. In particular embodiments, and as defined/encoded in the token, the system may retrieve the entirety of particular loan data, or only a specific portion of the loan data.

At step 710, according to various aspects of the present disclosure, the system furthermore validates the token's requested destination for the data, and if determined to be valid, transmits the data to the destination (step 712). In particular embodiments, the requesting party may also access and retrieve (via the token) the data included in the ledger without the system's intervention.

Exemplary Architecture

From the foregoing, it will be understood that various aspects of the processes described herein are software processes that execute on computer systems that form parts of the system. Accordingly, it will be understood that various embodiments of the system described herein are generally implemented as specially-configured computers including various computer hardware components and, in many cases, significant additional features as compared to conventional or known computers, processes, or the like, as discussed in greater detail herein. Embodiments within the scope of the present disclosure also include computer-readable media for carrying or having computer-executable instructions or data structures stored thereon. Such computer-readable media can be any available media which can be accessed by a computer, or downloadable through communication networks. By way of example, and not limitation, such computer-readable media can comprise various forms of data storage devices or media such as RAM, ROM, flash memory, EEPROM, CD-ROM, DVD, or other optical disk storage, magnetic disk storage, solid state drives (SSDs) or other data storage devices, any type of removable nonvolatile memories such as secure digital (SD), flash memory, memory stick, etc., or any other medium which can be used to carry or store computer program code in the form of computer-executable instructions or data structures and which can be accessed by a general purpose computer, special purpose computer, specially-configured computer, mobile device, etc. When information is transferred or provided over a network or another communications connection (either hardwired, wireless, or a combination of hardwired or wireless) to a computer, the computer properly views the connection as a computer-readable medium. Thus, any such a connection is properly termed and considered a computer-readable medium. Combinations of the above should also be included within the scope of computer-readable media. Computer-executable instructions comprise, for example, instructions and data which cause a general purpose computer, special purpose computer, or special purpose processing device such as a mobile device processor to perform one specific function or a group of functions.

Those skilled in the art will understand the features and aspects of a suitable computing environment in which aspects of the disclosure may be implemented. Although not required, some of the embodiments of the claimed systems may be described in the context of computer-executable instructions, such as program modules or engines, as described earlier, being executed by computers in networked environments. Such program modules are often reflected and illustrated by flow charts, sequence diagrams, exemplary screen displays, and other techniques used by those skilled in the art to communicate how to make and use such computer program modules. Generally, program modules include routines, programs, functions, objects, components, data structures, application programming interface (API) calls to other computers whether local or remote, etc. that perform particular tasks or implement particular defined data types, within the computer. Computer-executable instructions, associated data structures and/or schemas, and program modules represent examples of the program code for executing steps of the methods disclosed herein. The particular sequence of such executable instructions or associated data structures represent examples of corresponding acts for implementing the functions described in such steps.

Those skilled in the art will also appreciate that the claimed and/or described systems and methods may be practiced in network computing environments with many types of computer system configurations, including personal computers, smartphones, tablets, hand-held devices, multi-processor systems, microprocessor-based or programmable consumer electronics, networked PCs, minicomputers, mainframe computers, and the like. Embodiments of the claimed system are practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

An exemplary system for implementing various aspects of the described operations, which is not illustrated, includes a computing device including a processing unit, a system memory, and a system bus that couples various system components including the system memory to the processing unit. The computer will typically include one or more data storage devices for reading data from and writing data to. The data storage devices provide nonvolatile storage of computer-executable instructions, data structures, program modules, and other data for the computer.

Computer program code that implements the functionality described herein typically comprises one or more program modules that may be stored on a data storage device. This program code, as is known to those skilled in the art, usually includes an operating system, one or more application programs, other program modules, and program data. A user may enter commands and information into the computer through keyboard, touch screen, pointing device, a script containing computer program code written in a scripting language or other input devices (not shown), such as a microphone, etc. These and other input devices are often connected to the processing unit through known electrical, optical, or wireless connections.

The computer that effects many aspects of the described processes will typically operate in a networked environment using logical connections to one or more remote computers or data sources, which are described further below. Remote computers may be another personal computer, a server, a router, a network PC, a peer device or other common network node, and typically include many or all of the elements described above relative to the main computer system in which the systems are embodied. The logical connections between computers include a local area network (LAN), a wide area network (WAN), virtual networks (WAN or LAN), and wireless LANs (WLAN) that are presented here by way of example and not limitation. Such networking environments are commonplace in office-wide or enterprise-wide computer networks, intranets, and the Internet.

When used in a LAN or WLAN networking environment, a computer system implementing aspects of the system is connected to the local network through a network interface or adapter. When used in a WAN or WLAN networking environment, the computer may include a modem, a wireless link, or other mechanisms for establishing communications over the wide area network, such as the Internet. In a networked environment, program modules depicted relative to the computer, or portions thereof, may be stored in a remote data storage device. It will be appreciated that the network connections described or shown are exemplary and other mechanisms of establishing communications over wide area networks or the Internet may be used.

While various aspects have been described in the context of a preferred embodiment, additional aspects, features, and methodologies of the claimed systems will be readily discernible from the description herein, by those of ordinary skill in the art. Many embodiments and adaptations of the disclosure and claimed systems other than those herein described, as well as many variations, modifications, and equivalent arrangements and methodologies, will be apparent from or reasonably suggested by the disclosure and the foregoing description thereof, without departing from the substance or scope of the claims. Furthermore, any sequence(s) and/or temporal order of steps of various processes described and claimed herein are those considered to be the best mode contemplated for carrying out the claimed systems. It should also be understood that, although steps of various processes may be shown and described as being in a preferred sequence or temporal order, the steps of any such processes are not limited to being carried out in any particular sequence or order, absent a specific indication of such to achieve a particular intended result. In most cases, the steps of such processes may be carried out in a variety of different sequences and orders, while still falling within the scope of the claimed systems. In addition, some steps may be carried out simultaneously, contemporaneously, or in synchronization with other steps.

CONCLUSION

Aspects, features, and benefits of the claimed invention(s) will become apparent from the information disclosed in the exhibits and the other applications as incorporated by reference.

Variations and modifications to the disclosed systems and methods may be effected without departing from the spirit and scope of the novel concepts of the disclosure.

It will, nevertheless, be understood that no limitation of the scope of the disclosure is intended by the information disclosed in the exhibits or the applications incorporated by reference; any alterations and further modifications of the described or illustrated embodiments, and any further applications of the principles of the disclosure as illustrated therein are contemplated as would normally occur to one skilled in the art to which the disclosure relates.

The foregoing description of the exemplary embodiments has been presented only for the purposes of illustration and description and is not intended to be exhaustive or to limit the inventions to the precise forms disclosed. Many modifications and variations are possible in light of the above teaching.

The embodiments were chosen and described in order to explain the principles of the inventions and their practical application so as to enable others skilled in the art to utilize the inventions and various embodiments and with various modifications as are suited to the particular use contemplated. Alternative embodiments will become apparent to those skilled in the art to which the present inventions pertain without departing from their spirit and scope. Accordingly, the scope of the present inventions is defined by the appended claims rather than the foregoing description and the exemplary embodiments described therein.

What is claimed is:

1. A system comprising:
    a server comprising an append-only ledger; and
    a processor operatively connected to the server, wherein
       the processor is configured to:

generate a predictive data model by training, via machine learning, the predictive data model with data from a plurality of historical financial loan applications, wherein the predictive data model is configured to identify deviations in an individual's financial loan application, wherein the deviations indicate particular financial loan elements in the individual's financial loan application that are likely to comprise anomalies based on similar known unsatisfactory financial loan elements in the plurality of historical financial loan applications, wherein the predictive data model is further configured to generate one or more weighted coefficients corresponding to a Bayesian inference network, and wherein each of the one or more weighted coefficients corresponds to a statistical relationship between a particular deviation in the individual's financial loan application and a particular similar known unsatisfactory financial loan element in the plurality of historical financial loan applications;

receive data from one or more third parties, wherein the data comprises one or more financial loan elements from the individual's financial loan application identified as unsatisfactory by the one or more third parties;

retrieve corresponding loan data from the append-only ledger at the server, wherein the corresponding loan data is retrieved via a unique token comprising encrypted information relating to an owner of the corresponding loan data, and wherein the corresponding loan data comprises information sampled from the individual's financial loan application;

compare the one or more financial loan elements identified as unsatisfactory to the retrieved corresponding loan data for determining if the one or more financial loan elements are unsatisfactory; and automatically update the one or more weighted coefficients corresponding to the Bayesian inference network based on the comparison, wherein the one or more weighted coefficients are strengthened if the corresponding loan data falsifies the one or more financial loan elements identified as unsatisfactory, and wherein updating the one or more weighted coefficients comprises retraining the predictive data model with the updated one or more weighted coefficients.

2. The system of claim 1, wherein the append-only ledger is a blockchain ledger.

3. The system of claim 1, wherein the append-only ledger is a QLDB ledger.

4. The system of claim 1, wherein the data received from the one or more third parties comprises data formatted in accordance with a Form 1003 mortgage application.

5. The system of claim 1, wherein the corresponding loan data comprises underwriting history associated with the received data.

6. The system of claim 1, wherein the retrieved corresponding loan data comprises published investor guidelines, and wherein the published investor guidelines are published to the append-only ledger by a particular third-party via an API providing permissioned access to the append-only ledger via a web portal.

7. The system of claim 1, wherein the retrieved corresponding loan data comprises loan data not directly related to the received data from the one or more third parties.

8. The system of claim 7, wherein the loan data not directly related to the received data from the one or more third parties comprises sample data corresponding to loans similar to the received data.

9. The system of claim 8, wherein the processor retrieves the sample data according to an algorithm trained via deep learning techniques.

10. A method, wherein via a processor operatively connected to a server comprising an append-only ledger, the processor is configured to execute the steps comprising:

generating a predictive data model by training the predictive data model with data from a plurality of historical financial loan applications, wherein the predictive data model is configured to identify deviations in an individual's financial loan application, wherein the deviations indicate particular financial loan elements in the individual's financial loan application that are likely to comprise anomalies based on similar known unsatisfactory financial loan elements in the plurality of historical financial loan applications, wherein the predictive data model is further configured to generate one or more weighted coefficients corresponding to a Bayesian inference network, and wherein each of the one or more weighted coefficients corresponds to a statistical relationship between a particular deviation in the individual's financial loan application and a particular similar known unsatisfactory financial loan element in the plurality of historical financial loan applications;

receiving data from one or more third parties, wherein the data comprises one or more financial loan elements from the individual's financial loan application identified as unsatisfactory by the one or more third parties;

retrieving corresponding loan data from the append-only ledger at the server, wherein the corresponding loan data is retrieved via a unique token comprising encrypted information relating to an owner of the corresponding loan data, and wherein the corresponding loan data comprises information sampled from the individual's financial loan application;

comparing the one or more financial loan elements identified as unsatisfactory to the retrieved corresponding loan data for determining if the one or more financial loan elements are unsatisfactory; and automatically updating the one or more weighted coefficients corresponding to the Bayesian inference network based on the comparison, wherein the one or more weighted coefficients are strengthened if the corresponding loan data falsifies the one or more financial loan elements identified as unsatisfactory, and wherein updating the one or more weighted coefficients comprises retraining the predictive data model with the updated one or more weighted coefficients.

11. The method of claim 10, wherein the append-only ledger is a blockchain ledger.

12. The method of claim 10, wherein the append-only ledger is a QLDB ledger.

13. The method of claim 10, wherein the data received from the one or more third parties comprises data formatted in accordance with a Form 1003 mortgage application.

14. The method of claim 10, wherein the corresponding loan data comprises underwriting history associated with the received data.

15. The method of claim 10, wherein the retrieved corresponding loan data comprises published investor guidelines, and wherein the published investor guidelines are published to the append-only ledger by a particular third-party via an API providing permissioned access to the append-only ledger via a web portal.

16. The method of claim 10, wherein the retrieved corresponding loan data comprises loan data not directly related to the received data from the one or more third parties.

17. The method of claim 16, wherein the loan data not directly related to the received data from the one or more third parties comprises sample data corresponding to loans similar to the received data.

18. The method of claim 17 wherein the processor retrieves the sample data according to an algorithm trained via deep learning techniques.

* * * * *